United States Patent [19]

Murschall et al.

[11] Patent Number: 5,723,088
[45] Date of Patent: Mar. 3, 1998

[54] PROCESS FOR THE PRODUCTION OF A HEAT-SEALABLE ORIENTED MULTILAYER POLYOLEFIN FILM

[75] Inventors: Ursula Murschall, Nierstein; Herbert Peiffer, Mainz; Gunter Schloegl, Kelkheim, all of Germany

[73] Assignee: Hoechst Aktiengesellschaft, Frankfurt am Main, Germany

[21] Appl. No.: 751,609

[22] Filed: Nov. 18, 1996

Related U.S. Application Data

[62] Division of Ser. No. 200,145, Feb. 23, 1994, Pat. No. 5,618,618.

[30] Foreign Application Priority Data

Feb. 27, 1993 [DE] Germany ............... 43 06 153.2

[51] Int. Cl.$^6$ ................................. B29C 47/06
[52] U.S. Cl. .............. 264/469; 264/483; 264/173.15; 264/173.19; 264/210.7; 264/235.8; 264/290.2
[58] Field of Search ................. 264/469, 471, 264/483, 211, 173.15, 173.19, 210.7, 235.6, 235.8, 290.2, 346; 428/331

[56] References Cited

U.S. PATENT DOCUMENTS

| | | | |
|---|---|---|---|
| 3,655,503 | 4/1972 | Stanley et al. | 161/165 |
| 4,117,193 | 9/1978 | Tsuchiya et al. | 428/339 |
| 4,419,411 | 12/1983 | Park | 428/516 |
| 4,590,125 | 5/1986 | Balloni et al. | 428/349 |
| 4,617,327 | 10/1986 | Podszun | 523/116 |
| 4,618,527 | 10/1986 | Doyen | 428/213 |
| 4,622,237 | 11/1986 | Lori | |
| 4,692,379 | 9/1987 | Keung et al. | 428/349 |
| 4,711,673 | 12/1987 | Musselman et al. | 106/287.17 |
| 4,734,317 | 3/1988 | Bothe et al. | 428/215 |
| 4,764,425 | 8/1988 | Balloni et al. | 428/331 |
| 4,911,976 | 3/1990 | Park et al. | 428/216 |
| 5,366,796 | 11/1994 | Mujrschall et al. | 428/216 |

FOREIGN PATENT DOCUMENTS 41 09 368  9/1992  Germany.

OTHER PUBLICATIONS

R. Gaechter et al., "Taschenbuch der Kunststoff–Additive", Carl Hanser Verlag, Meunchen, 1989, pp. 568–571.

N. Kitamura, "Surface Modification of Fillers and Pigments", Chemical Abstracts, JP–A–6201758, vol. 106, No. 26, Jun. 1987, Abstract No. 215579p.

Database WPI, Derwent Publications Ltd., JP–A–5 104 621 (Mitsubishi Plastics Ind.), Apr. 1993.

*Primary Examiner*—Mathieu D. Vargot
*Attorney, Agent, or Firm*—Foley & Lardner

[57] ABSTRACT

An oriented multilayer polyolefin film which includes a base layer containing polypropylene, and at least one heat-sealable outer layer. In one embodiment, the base layer contains a tertiary aliphatic amine and an amide of a water-insoluble carboxylic acid having 8 to 24 carbon atoms and the heat-sealable outer layer contains $SiO_2$. The multilayer film is essentially free from silicone oil and is useful, for example, as a packaging film.

18 Claims, No Drawings

PROCESS FOR THE PRODUCTION OF A HEAT-SEALABLE ORIENTED MULTILAYER POLYOLEFIN FILM

This application is a division of application Ser. No. 08/200,145, filed Feb. 23, 1994, now U.S. Pat. No. 5,618, 618.

BACKGROUND OF THE INVENTION

1. Field of the invention

The invention relates to an oriented multilayer polyolefin film comprising a base layer containing polypropylene, and at least one heat-sealable outer layer. The films are distinguished by a low coefficient of friction in combination with excellent heat-sealability and excellent processing properties.

2. Description of Related Art

The art describes various films having a low coefficient of friction. However, the demands made of the processing properties of films and their smooth passage through automatic machines have increased constantly over the years. For this reason, ever-lower coefficients of friction are demanded; today the term "low" friction values means in the order of from 0.3 to 0.1, while a few years ago, a friction value of from 0.4 to 0.5 was regarded as extremely low.

It is known from the art that the surface-slip characteristics of polyolefin films can be improved by adding a carboxamide. The films described contain amides in the outer layers or in the base and outer layers.

DE-A-2,001,032 describes films made from various thermoplastics whose surface-slip characteristics have been improved by addition of carboxamides and antiblocking agents. Since sufficient amounts of lubricants cannot be incorporated into the outer layers alone, the additional incorporation of the amides into the base layer is recommended. These films have a coefficient of friction in the range from 0.4 to 0.8 and thus no longer meet today's quality requirements. U.S. Pat. No. 4,117,193 describes multilayer films comprising a polypropylene base layer containing a lubricant, an antiblocking agent and an antistatic. The outer layer of these films comprises a polymer blend, and additionally contains a lubricant and an antiblocking agent. The polymer blend comprises an ethylene-butylene copolymer and a polyolefinic resin such as HDPE or LDPE. It is stated that the deficient surface-slip characteristics of the films cannot be sufficiently improved by the addition of lubricants and antiblocking agents alone. For this reason, the outer layer is modified by addition of HDPE or LDPE in combination with a lubricant and antiblocking agent. According to the examples and comparative examples, the reduction in the coefficient of friction is essentially due to the addition of HDPE. Pure copolymer outer layers having the same additive composition have coefficients of friction of from 0.7 to 0.8. The films combine excellent coefficients of friction with good printability, but the addition of the friction-reducing polyolefinic resin means that they have very unsatisfactory haze and gloss.

The art furthermore states that an excellent lubricant for achieving friction values of less than 0.3 is the addition of silicone oil to polyolefinic films. Some publications recommend the use of the silicone oil in combination with other lubricants.

EP-A-0,182,463 describes a multilayer film containing from 0.05 to 0.2% by weight of tertiary aliphatic amine in the base layer and a combination of silicone oil and $SiO_2$ in the heat-sealable outer layer. According to the description, the surprising interaction of $SiO_2$, silicone oil and amine in combination with a selected outer layer thickness of less than 0.8 μm gives films having a coefficient of friction of 0.3 or less. In spite of this excellent coefficient of friction, the processing properties of the film are deficient. In particular, it is not printable and is therefore unsuitable for many applications.

EP-A-0,143,130 discloses films containing a carboxamide in the base layer and likewise the combination of silicone oil and $SiO_2$ in the outer layer. As in EP-A-0,182,463 mentioned above, a synergistic effect of the three selected components on the coefficient of friction is described. These films likewise have deficient processing properties, in spite of their advantageous surface slip. They too lack the important property of printability.

EP-A-0,194,588 and EP-A-0,217,598 describe a film which, in spite of good surface- slip characteristics, is readily printable in spite of the addition of silicone oil. In these films, silicone oil, if desired in combination with $SiO_2$, is only incorporated into one outer layer. The second, silicone oil-free outer layer is corona-treated to improve the printability. The transfer of silicone oil onto the surface of this treated second outer layer subsequently takes place by contact with the first, silicone oil-containing outer layer. This trick gives a silicone oil-treated film having good surface-slip characteristics which is simultaneously readily printable on the corona-treated side, but is nevertheless heat-sealable.

This film has the disadvantage that it is only printable on one side. This is particularly disadvantageous for use of the film in the packaging sector. Packaging frequently requires further labeling on its second surface, for example a bar code, and for this reason requires a film having good surface-slip characteristics which is printable on both sides. It has furthermore proven disadvantageous that the pretreatment intensity of the corona-treated surface is no longer measureable due to the siloxane. This means that it is difficult for the film processor to check the surface tension of the film, an important quality feature. The processing properties of the film are also unsatisfactory.

SUMMARY OF THE INVENTION

It is therefore an object of the present invention to provide a multilayer polypropylene film which has a low coefficient of friction. The film should have better processing properties than known films. A further object is for the film to be heat-sealable, and to be printable on both sides. The pretreatment intensity should be easy for the processor to measure. However, these improvements should not impair the external appearance of the film, i.e., the film should simultaneously have the lowest possible haze and high gloss.

It is further an object of the present invention to provide a method of making such a film.

It is also an object to provide methods of using such films, such as in packaging and laminates.

It is also an object of the present invention to provide a method for processing such films.

In accordance with these objectives, there has been provided, in accordance with a first aspect of the present invention a biaxially-oriented multilayer polyolefin film comprising a base layer comprising a propylene polymer, a tertiary aliphatic amine, and an amide of a water-insoluble carboxylic acid having 8 to 24 carbon atoms, and a heat-sealable outer layer containing a heat-sealable olefin polymer and $SiO_2$, wherein the multilayer film is essentially free from silicone oil.

In accordance with another aspect of the present invention, there has been provided a biaxially-oriented multilayer polyolefin film comprising a base layer containing polypropylene, and at least one heat-sealable outer layer, wherein the multilayer film has a coefficient of friction of from 0.12 to 0.3 after processing and contains essentially no silicone oil.

In accordance with another aspect of the present invention, there has been provided a process for the production of the multilayer polyolefin film described above, in which the melts corresponding to the individual layers of the film are coextruded through a flat-film die, the coextruded film is taken off via a take-off roll whose temperature is from 50° to 110° C., the film is biaxially stretched at a longitudinal stretching ratio of from 4:1 to 7:1 and a transverse stretching ratio of from 8:1 to 10:1, the biaxially-stretched film is thermofixed, optionally corona-treated, and subsequently wound up, wherein the film has a coefficient of friction of from 0.2 to 0.3, after processing.

Further objects, features and advantages of the invention will become apparent from a review of the detailed description of the preferred embodiments which follows.

DETAILED DESCRIPTION OF THE PREFERRED EMBODIMENTS

The base layer of the multilayer film according to the invention essentially comprises a propylene polymer and, if desired, additives other than silicone oil, in effective amounts in each case. "Essentially comprises" means that the propylene polymer or a mixture of propylene polymers is generally present in an amount of at least 50%, preferably of at least 90% by weight, based on the weight of the base layer.

Any polymer from propylene can be used as the propylene polymer of the base layer. In particular, the polypropylene polymer generally contains at least 50%, preferably at least 90% by weight propylene and generally has a melting point of 140° C. or above, preferably from 150° to 170° C.

Isotactic homopolypropylene having an n-heptane-soluble content of 6% by weight or less, based on the isotactic homopolypropylene, copolymers of ethylene and propylene having an ethylene content of 5% by weight or less, and copolymers of propylene with $C_4$–$C_8$-α-olefins having an α-olefin content of 5% by weight or less are preferred propylene polymers for the base layer, particular preference being given to isotactic polypropylene. These percentages by weight relate, in each case, to the respective copolymer. The propylene polymer of the base layer generally has a melt flow index of from 0.5 g/10 min to 10 g/10 min, preferably from 1.5 g/10 min to 4 g/10 min, at 230° C. and a force of 21.6 N (DIN 53 735).

Any desired heat-sealable outer layer can be used as long as it is essentially free of silicone oil. The outer layer generally contains one or more heat-sealable olefin polymer, generally in amounts of at least 50% by weight of the outer layer. Preferred heat-sealable olefin polymers include a copolymer or terpolymer of propylene or a mixture of two or more such copolymers and/or terpolymers. The copolymers and terpolymers generally contain propylene as the principal component in an amount of at least 50% by weight, based on the respective polymer. Suitable comonomers include ethylene and α-olefins having 4 to 10 carbon atoms. It has proven particularly advantageous for the heat-sealable outer layer to contain one or more of propylene-ethylene copolymers, propylene-butylene copolymers, and propylene-ethylene-butylene terpolymers and mixtures of these propylene polymers.

Particular preference for the heat-sealable olefin is given to random ethylene-propylene copolymers having an ethylene content of from 2 to 10% by weight, preferably from 5 to 8% by weight, or random propylene-1-butylene copolymers having a butylene content of from 4 to 25% by weight, preferably from 10 to 20% by weight, in each case based on the total weight of the copolymer, or random ethylene-propylene-1-butylene terpolymers having an ethylene content of from 1 to 10% by weight, preferably from 2 to 6% by weight, and a 1-butylene content of from 3 to 20% by weight, preferably from 8 to 10% by weight, in each case based on the total weight of the terpolymer, or a blend of an ethylene-propylene-1-butylene terpolymer and a propylene-1-butylene copolymer having an ethylene content of from 0.1 to 7% by weight and a propylene content of from 50 to 90% by weight and a 1-butylene content of from 10 to 40% by weight, in each case based on the total weight of the polymer blend.

The multilayer film according to the invention is essentially free of silicone oil and comprises at least the above-described polypropylene base layer and at least one heat-sealable outer layer which preferably contains the above-described propylene polymers or mixtures thereof. Depending on its intended application, the multilayer film can have a further outer layer on the opposite side. In a preferred embodiment, the multilayer film has three layers, where the outer layers applied may be identical or different.

The thickness of the sealable outer layer(s) can be varied to achieve the desired properties and is generaly greater than 0.4 µm and is preferably in the range from 0.6 to 4 µm, in particular from 0.8 to 2 µm, where outer layers on both sides may have identical or different thicknesses.

The overall thickness of the multilayer polyolefin film according to the invention can vary within broad limits and depends on the intended application. It is preferably from 5 to 70 µm, in particular from 10 to 50 µm, the base layer making up from about 50 to 90% of the overall film thickness.

It is essential to the invention that the multilayer film be essentially free from silicone oil. It has been found that silicone oil-free films offer a number of advantages, and, surprisingly, a very low coefficient of friction of less than 0.3 can still be achieved before and after processing. Without silicone oil, the film can easily be corona-treated without impairing the heat-sealability of the outer layer. The treatment intensity readily can be measured without the necessity of removing the silicone oil coating in an additional step. Without silicone oil, a bar code adheres well to the packaging film. Completely unexpectedly, the film of the present invention without silicone oil exhibits excellent processing properties.

Accordingly, the present films are essentially free of silicone oil, so that these excellent properties are achieved. In a preferred embodiment of the present invention, the film contains a combination of a tertiary aliphatic amine and an amide of a water-insoluble carboxylic acid having 8 to 24 carbon atoms in its base layer and has $SiO_2$ in at least one heat-sealable outer layer. Surprisingly, this additive combination makes it possible, without additional lubricants such as silicone oil or additional polyolefinic resins (as in U.S. Pat. No. 4,117,193), to reduce the coefficient of friction of the polypropylene film to values of below 0.3 or below 0.2.

generally from 0.12 to 0.3 or 0.12 to 0.2, thus providing a film which has the requisite surface-slip characteristics, but no longer has the disadvantages of the known films having a low coefficient of friction. In particular the present film is readily printable and has excellent values for gloss and haze. The coefficient of friction is measured by DIN 53 375 which is hereby incorporated by reference.

Carboxamides useful in the present invention include amides of a water-insoluble carboxylic acid having 8 to 24 carbon atoms or mixtures of these amides. Any such amides can be used with particular preference given to erucamide, oleamide, stearamide and the like. It has proven particularly advantageous to incorporate the amide only into the base layer of the multilayer film, preferably in an amount of from 0.05 to 0.3% by weight, particularly favorably in an amount of from 0.10 to 0.3, preferably from 0.10 to 0.25% by weight based on the weight of the base layer.

Tertiary aliphatic amines useful in the base layer include any tertiary aliphatic amines including compounds of the formula $R_3N$, in which R is a fatty acid radical or a $C_{12}$–$C_{18}$-alkyl radical or a hydroxyl-substituted alkyl radical, where the radicals R may be identical or different. Hydroxyl-substituted alkyl radicals are preferably hydroxyethyl, hydroxypropyl or hydroxybutyl radicals. Particular preference is given to N,N-bis(2-hydroxyethyl) alkylamines. The tertiary aliphatic amines are particularly favorably employed in an amount of from 0.03 to 0.25% by weight, particularly advantageously in an amount of from 0.1 to 0.15% by weight, based on the weight of the base layer.

The outer layer preferably contains from 0.1 or 0.2 to 0.5% by weight of $SiO_2$. The $SiO_2$ has preferably been subjected to organic aftertreatment coating and has a mean particle diameter of from 2 to 6 μm, more preferably, 3 to 5 μm, most preferably about 4 μm. The particle diameter: outer layer thickness ratio should be in the range from 3 to 11, preferably from about 4 to 10, in particular from 6 to 8.

$SiO_2$ is preferably prepared by grinding silica gel and is a synthetic, highly porous, pure silicic acid which has a completely amorphous structure, in contrast to crystalline silicic acids. The $SiO_2$ content is generally greater than 95%, in particular in the range from 98 to 99.5%.

According to the invention, the $SiO_2$ particles have preferably been subjected to organic aftertreatment coating and have a coating preferably containing from 0.5 to 5% of an aliphatic carboxylic acid. Preferred aliphatic carboxylic acids are aliphatic hydroxydi- and -tricarboxylic acids and stearic acid. In general, the acids have two to five, preferably two to three, hydroxyl groups. Preferred aliphatic carboxylic acids are tartronic acid (hydroxymalonic acid), malic acid (monohydroxysuccinic acid), tartaric acid (dihydroxysuccinic acid) and citric acid. Citric acid-containing coatings have proven very particularly advantageous. Due to the organic coating, the $SiO_2$ particles are slightly acidic in aqueous solutions, such that the pH of a 5% strength aqueous suspension is generally in the range from 3 to 5, preferably 4.

In addition to these selected additives, the multilayer film according to the invention may additionally contain other additives, such as neutralizers and/or stabilizers in effective amounts.

The stabilizers employed can be any of the conventional stabilizing compounds for ethylene, propylene and other α-olefin polymers. The amount thereof added is generally from 0.05 to 2% by weight. Phenolic stabilizers, alkali/alkaline earth metal stearates and/or alkali/alkaline earth metal carbonates are particularly suitable.

Phenolic stabilizers are preferred in an amount of from 0.1 to 0.6% by weight, in particular from 0.15 to 0.3% by weight, and with a molecular weight greater than 500 g/mol. Pentaerythrityl tetrakis[3-(3,5-di-tert.-butyl-4-hydroxyphenyl)propionate] and 1,3,5-trimethyl-2,4,6-tris(3,5-di-tert.-butyl-4-hydroxybenzyl)benzene are particularly advantageous.

Neutralizers include any known neutralizers, but are preferably calcium stearate and/or calcium carbonate having a mean particle size of at most 0.7 μm, an absolute particle size of less than 10 μm and a specific surface area of at least 40 m²/g.

The invention furthermore relates to a process for the production of the multilayer film. Any desired process can be used, but the coextrusion process which is known per se, is generally used. This process involves coextruding the melts corresponding to the individual layers of the film through a flat-film die, taking off the resultant film on one or more rolls for solidification, subsequently biaxially stretching or orienting the film, thermofixing the biaxially-stretched film and, if desired, corona-treating or flame-treating the film on the surface layer intended for corona treatment.

The biaxial stretching or orientation can be carried out simultaneously or consecutively, preference being given to consecutive biaxial stretching in which stretching is carried out first longitudinally (in the machine direction) and then transversely (perpendicular to the machine direction).

As is usual in the coextrusion process, the polymer or polymer mixture of the individual layers is first compressed and liquefied in an extruder, it being possible for the additives to be already contained in the polymer or polymer mixture via conventional masterbatch processing. The additives also can be added directly to the polymer melt before the extrusion. The melts are then simultaneously forced through a flat-film die (slot die), and the extruded multilayer film is taken off on one or more take-off rolls, during which it cools and solidifies.

The resultant film is then stretched longitudinally and transversely to the extrusion direction, which results in an orientation of the molecule chains. The stretching in the longitudinal direction is preferably from 4:1 to 7:1 and in the transverse direction is preferably from 8:1 to 10:1. The longitudinal stretching is expediently carried out with the aid of two rolls running at different speeds corresponding to the desired stretching ratio, and the transverse stretching is generaly carried out with the aid of an appropriate tenter frame.

The biaxial stretching of the film is followed by thermofixing (heat treatment) thereof, during which the film is kept at a temperature of generally from 140° to 160° C., generally for from about 0.5 to 10 sec. The film is subsequently wound up in a conventional manner using a wind-up unit.

It has proven particularly favorable to keep the take-off roll or rolls, which also cool and solidify the extruded film, at a temperature from 50° to 110° C., preferably 80° to 110° C.

The temperatures at which the longitudinal and transverse stretching are carried out may vary. In general, the longitudinal stretching is preferably carried out at from 120° to 150° C., and the transverse stretching at from 155° to 190° C.

If desired, as mentioned above, the biaxial stretching can be followed by corona or flame treatment of one or both surfaces of the film by one of the known methods.

Corona treatment expediently involves passing the film between two conductor elements serving as electrodes, with such a high voltage, usually an alternating voltage (from about 10 to 20 kV and 20 to 40 kHz), being applied between the electrodes that spray or corona discharges can occur. The spray or corona discharge causes the air above the film surface to ionize and react with the molecules of the film surface, forming polar intrusions in the essentially nonpolar polymer matrix.

For flame treatment with a polarized flame (cf. U.S. Pat. No. 4,622,237), generally a direct electrical voltage is applied between a burner (negative pole) and a chill roll. The level of the applied voltage is generally from 500 to 3,000 V, preferably in the range from 1,500 to 2,000 V. The applied voltage increases the acceleration of the ionized atoms, which hit the polymer surface with greater kinetic energy. The chemical bonds within the polymer molecule become easier to break, and the formation of free radicals proceeds more rapidly. The thermal load on the polymer during this procedure is substantially less than in the case of standard flame treatment, and films can be obtained in which the heat-sealing properties of the treated side are even better than those of the untreated side.

The film according to the invention is distinguished by a very good coefficient of friction, generally less than 0.3, in combination with good heat-sealing properties. Furthermore, the film can be printed very well and on both sides. It thus has a combination of properties which cannot readily be achieved simultaneously without disadvantageously affecting other properties. In addition, the film has better gloss and haze than known films.

The invention furthermore relates to a method for processing the multilayer film. Any desired processing can be applied to the film, preferably printing and/or lamination and/or coating and/or cutting and/or embossing.

The film has particular advantages with respect to its processing properties. It has been found that a low coefficient of friction of the outer layer alone does not reliably ensure good processing properties, and that the coefficient of friction of many films increases during said further processing steps. Surprisingly, the films having the novel additive combination have a coefficient of friction of the outer layer which is lower after processing than before, preferably less than 0.3 after processing. This unexpected effect gives the film clearly superior surface-slip characteristics after processing than the films of the prior art. Neither the importance of the stability of the coefficient of friction during processing nor the targeted achievement of processing-stable surface-slip characteristics were known hitherto.

The invention is now illustrated in greater detail with reference to working examples.

EXAMPLE 1

A three-layer film having an overall thickness of 20 μm and an ABA layer structure, i.e., a base layer surrounded by two identical outer layers A, was produced by coextrusion and subsequent stepwise orientation in the longitudinal and transverse directions. Each of the outer layers had a thickness of 0.7 μm. Before rolling up, the film was corona-treated on both sides. The surface tension of the film as a consequence of this treatment was from 39 to 40 mN/m on both sides.

All layers contained 0.13% by weight of pentaerythrityl tetrakis[4-(3,5-di-tert.-butyl-4-hydroxyphenyl)propionate] (®Irganox 1010) as stabilizer and 0.06% by weight of calcium stearate as neutralizer.

The base layer B essentially comprised a polypropylene homopolymer having an n-heptane-soluble content of 4% by weight and a melting point of from 160 to 162° C. The melt flow index of the polypropylene homopolymer was 3.2 g/10 min at 230° C. and a load of 21.6N (DIN 53 735). The base layer contained 0.11% by weight of N,N-bis(2-hydroxyethyl)-($C_{12}$–$C_{18}$)alkylamine (®Armostat 300) and 0.14% by weight of erucamide having a melting point of from 78° to 82° C.

The polyolefinic outer layers essentially comprised an ethylene-propylene-1-butylene terpolymer having a content of 3% by weight of ethylene, 89.0% by weight of propylene and 8% by weight of 1-butylene.

The outer layers contained 0.33% by weight of a silica having a mean particle diameter of 4 μm which had been subjected to organic aftertreatment with an organic acid.

EXAMPLE 2

Example 1 was repeated, but the base layer contained 0.05% by weight of the tertiary aliphatic amine N,N-bis(2-hydroxyethyl)-($C_{12}$–$C_{18}$)alkylamine and 0.17% by weight of erucamide.

EXAMPLE 3

Example 1 was repeated, but the polyolefinic outer layers essentially comprised a random ethylene-propylene-1-butylene terpolymer having a content of 4% by weight of ethylene, 90% by weight of propylene and 6% by weight of 1-butylene. As in Example 1, the outer layers contained 0.33% by weight of silicon dioxide which had been subjected to organic aftertreatment.

EXAMPLE 4

Example 1 was repeated, but the polyolefinic outer layers essentially comprised a random ethylene-propylene copolymer having a content of 4.5% by weight of ethylene and 95.5% by weight of propylene. As in Example 1, the outer layers contained 0.33% by weight of silicon dioxide which had been subjected to organic aftertreatment.

COMPARATIVE EXAMPLE 1

Example 1 was repeated. As in Example 1, the outer layers essentially comprised a random ethylene-propylene-1-butylene terpolymer, but the outer layers did not contain any silicon dioxide.

COMPARATIVE EXAMPLE 2

Example 1 was repeated, but the base layer did not contain any erucamide.

COMPARATIVE EXAMPLE 3

Example 1 was repeated, but the base layer did not contain any N,N-bis(2-hydroxyethyl)-($C_{12}$–$C_{18}$)alkylamine.

COMPARATIVE EXAMPLE 4

Example 1 was repeated. The outer layers contained 0.33% by weight of silicon dioxide which had been subjected to organic aftertreatment and 1.0% by weight of polydimethylsiloxane (silicone oil) having a kinematic viscosity of 30,000 mm$^2$/s at 25° C.

COMPARATIVE EXAMPLE 5

A three-layer film having an ABA structure corresponding to Example 1 of EP-A-0 182 463 which is hereby incorporated by reference was produced. The film had not been corona-treated.

COMPARATIVE EXAMPLE 6

Comparative Example 5 was repeated, but the film was subjected to corona treatment on both sides before rolling up.

COMPARATIVE EXAMPLE 7

A three-layer film having an ABC structure corresponding to Example 1 of EP-A-0 194 588 which is hereby incorporated by reference was produced. The first side, which contained no silicone oil, had been corona-treated as described in EP-A-0 194 588.

The properties of the films of the examples and comparative examples are shown in Tables 1 and 2 below.

The raw materials and films were characterized using the following measurement methods:

Melt Flow Index

The melt flow index was measured in accordance with DIN 53 735 at a load of 21.6N and 230° C. or at a load of 50N and 190° C.

Melting Point

DSC measurement, maximum of the melting curve, heating rate 20° C./min.

Haze

The haze of the film was measured in accordance with ASTM-D 1003-52.

Gloss

The gloss was determined in accordance with DIN 67 530. The reflector value was measured as an optical characteristic of the surface of a film. In accordance with the standards ASTM-D 523-78 and ISO 2813, the angle of incidence was set at 20°. A light beam hits the planar test surface at the set angle of incidence and is reflected or scattered thereby. The light beams incident on the photoelectronic receiver are indicated as a proportional electrical quantity. The measurement value is dimensionless and must be given together with the angle of incidence.

Seal Seam Strength

For the determination, two film strips 15 mm in width were laid one on top of the other and sealed at 130° C. for 0.5 sec at a pressure of 10 mm$^2$ (instrument: Brugger type NDS, sealing jaws heated on one side). The seal seam strength was determined by the T-peel method.

Friction (Coefficient of Friction)

The friction was determined in accordance with DIN 53 375 on the heat-sealable layer.

Surface Tension

The surface tension was determined by the ink method (DIN 53 364).

Printability

The corona-treated films were printed 14 days after production (short-term assessment) and 6 months after production (long-term assessment). The ink adhesion was assessed by the adhesion-tape test. If the adhesive tape was able to remove a little ink, the ink adhesion was assessed as being moderate and if a significant amount of ink was removed, it was assessed as being poor.

Determination of the Minimum Heat-Sealing Temperature:

Heat-sealed samples (seal seam 20 mm×100 mm) are produced using the Brugger HSG/ET sealing unit by sealing a film at different temperatures with the aid of two heated sealing jaws at a pressure of 10 N/cm$^2$ for 0.5 sec. Test strips with a width of 15 mm are cut out of the sealed samples. The T-seal seam strength, i.e., the force necessary to separate the test strips, is determined using a tensile testing machine at a peel rate of 200 mm/min, during which the seal seam plane forms a right angle with the direction of tension. The minimum heat-sealing temperature is the temperature at which a seal seam strength of at least 0.5N/15 mm is achieved.

TABLE 1

| | Pretreatment intensity 14 days after production [mN/m] | | Printability | | Coefficient of friction | Coefficient of friction (14 days after production |
|---|---|---|---|---|---|---|
| | Side 1 | Side 2 | Side 1 | Side 2 | 14 days after production | after printing and lamination) |
| E1 | 39 | 39 | ++ | ++ | 0.20 | 0.16 |
| E2 | 39 | 39 | ++ | ++ | 0.20 | 0.15 |
| E3 | 38 | 38 | ++ | ++ | 0.22 | 0.18 |
| E4 | 39 | 39 | ++ | ++ | 0.20 | 0.17 |
| CE1 | 39 | 39 | ++ | ++ | film blocks >0.5 | film blocks >0.5 |
| CE2 | 39 | 39 | ++ | ++ | film blocks >0.5 | film blocks >0.5 |
| CE3 | 38 | 39 | ++ | ++ | 0.26* | 0.24* |
| CE4 | — | — | — | — | film blocks 0.4–0.5 | film blocks >0.5 |
| CE5 | — | — | — | — | 0.24 | 0.35 |
| CE6 | — | — | — | — | film blocks 0.4–0.5 | film blocks >0.5 |
| CE7 | 38** | — | +- | — | 0.28 | 0.5 |

*The film is statically charged and is difficult to process.
**The pretreatment intensity can only be measured after washing off the silicone oil with n-heptane.

TABLE 2

|  | Haze 4 layers [%] | Gloss Measurement angle 20° | | Minimum heat-sealing temperature (15 N/cm²; 0.5 s) [°C.] | | Seal seam strength (HSE) (130° C.; 1.5 N/cm²; 0.5s) [N/15 mm] | | Measurability of the pretreatment intensity | |
|---|---|---|---|---|---|---|---|---|---|
|  |  | Side 1 | Side 2 | Side 1/1 | Side 2/2 | Side 1/1 | Side 2/2 | Side 1 | Side 2 |
| E1 | 19 | 111 | 110 | 110 | 110 | 2.3 | 2.1 | ++ | ++ |
| E2 | 20 | 110 | 109 | 110 | 110 | 2.1 | 1.9 | ++ | ++ |
| E3 | 21 | 108 | 106 | 109 | 109 | 2.4 | 2.2 | ++ | ++ |
| E4 | 21 | 109 | 107 | 122 | 122 | 1.3 | 1.1 | ++ | ++ |
| CE1 | 18 | 113 | 112 | 109 | 109 | 2.4 | 2.2 | ++ | ++ |
| CE2 | 19 | 112 | 112 | 110 | 110 | 2.3 | 2.1 | ++ | ++ |
| CE3 | 19 | 110 | 109 | 110 | 109 | 2.1 | 2.0 | ++ | ++ |
| CE4 | 22 | 107 | 106 | no sealing | no sealing | no sealing | no sealing | −+ | −+ |
| CE5 | 22 | 108 | 108 | 122 | 120 | 1.4 | 1.2 | — | — |
| CE6 | 22 | 109 | 108 | no sealing | no sealing | no sealing | no sealing | −+ | −+ |
| CE7 | 21 | 107 | 106 | 124 | 122 | 1.3 | 1.1 | −+ | — |

What is claimed is:

1. A process for the production of a multilayer polyolefin film comprising a base layer including a propylene polymer, a tertiary aliphatic amine, and an amide of a water-insoluble carboxylic acid having 8 to 24 carbon atoms, and a heat-sealable outer layer comprising a heat-sealable olefin polymer and $SiO_2$ particles, wherein the multilayer film is essentially free from silicone oil, the process comprising extruding melts corresponding to individual layers of the film through a flat-film die, taking-off the coextruded film via a take-off roll, biaxially stretching the film, thermofixing the biaxially-stretched film, optionally flame- or corona-treating the film, and winding up the film.

2. A process as claimed in claim 1, wherein the $SiO_2$ particles have an organic coating and have a mean particle diameter of from 2 to 6 μm.

3. A process as claimed in claim 2, wherein the mean particle diameter is about 4 μm.

4. A process as claimed in claim 1, wherein the base layer contains from 0.03 to 0.25% by weight based on the weight of the base layer of the tertiary aliphatic amine and from 0.05 to 0.3% by weight based on the weight of the base layer of the amide, and wherein the outer layer contains from 0.1 to 0.5% by weight of $SiO_2$, based on the weight of the outer layer.

5. A process as claimed in claim 1, wherein the heat-sealable outer layer has a coefficient of friction of less than 0.3 after processing, by one or more of printing, laminating, coating, cutting or embossing.

6. A process as claimed in claim 5, wherein said outer layer has a coefficient of friction of from 0.12 to 0.3 after processing.

7. A process as claimed in claim 1, wherein there is an outer layer on each side of the base film, wherein the outer layers are the same or different.

8. A process as claimed in claim 1, wherein the heat-sealable outer layer has a thickness from 0.6 to 4 μm.

9. A process as claimed in claim 1, wherein the overall thickness of the film is from 5 to 70 μm.

10. A process as claimed in claim 1, wherein the $SiO_2$ particles have a coating of aliphatic carboxylic acid.

11. A process as claimed in claim 10, wherein the $SiO_2$ particles are coated with 0.5 to 5% by weight of aliphatic carboxylic acid, based on the weight of the particles.

12. A process as claimed in claim 1, wherein the base layer consists essentially of the propylene polymer, the amine, and the amide.

13. A process as claimed in claim 12, wherein the base layer further consists essentially of at least one additive selected from the group consisting of a neutralizer and a stabilizer.

14. A process as claimed in claim 1, wherein the heat-sealable outer layer comprises a copolymer of propylene or terpolymer of propylene.

15. A process as claimed in claim 1, wherein the take-off roll has a temperature of from 50° to 110° C.

16. A process as claimed in claim 1, wherein the biaxially stretching comprises longitudinal stretching at a ratio of from 4:1 to 7:1 and transverse stretching at a ratio of from 8:1 to 10:1.

17. A process as claimed in claim 1, wherein the thermofixing comprises keeping the film at a temperature of 140° to 160° C. for about 0.5 to 10 seconds.

18. A process as claimed in claim 1, wherein the biaxially stretching comprises longitudinal stretching at a temperature of 120° to 150° C. and transverse stretching at a temperature of 155° to 190° C.

* * * * *